United States Patent [19]

Irrgang

[11] Patent Number: 4,458,459
[45] Date of Patent: Jul. 10, 1984

[54] SECTIONAL MOLDING FOR SURROUNDING A PANE OF GLASS SEALED IN THE WINDOW OPENING OF A VEHICLE, OR THE LIKE

[75] Inventor: Manfred Irrgang, Wuppertal, Fed. Rep. of Germany

[73] Assignee: Gebr. Happich GmbH, Fed. Rep. of Germany

[21] Appl. No.: 405,289

[22] Filed: Aug. 4, 1982

[30] Foreign Application Priority Data

Aug. 8, 1981 [DE] Fed. Rep. of Germany ....... 3131529

[51] Int. Cl.³ .............................................. E06B 3/00
[52] U.S. Cl. ......................................... 52/208; 52/400
[58] Field of Search ................ 52/208, 397, 400, 716, 52/398, 399

[56] References Cited

U.S. PATENT DOCUMENTS

| 3,363,390 | 1/1968 | Crane | 52/716 |
| 3,448,550 | 6/1969 | Herr | 52/717 |
| 3,742,649 | 7/1973 | Dochnahl | 52/397 |
| 3,760,544 | 9/1973 | Hawes | |
| 3,802,143 | 4/1974 | Adler | 52/400 |

FOREIGN PATENT DOCUMENTS

| 1509250 | 1/1969 | Fed. Rep. of Germany | 52/400 |
| 1102045 | 2/1968 | United Kingdom | 52/716 |
| 2063979 | 11/1980 | United Kingdom | |

Primary Examiner—John E. Murtagh
Assistant Examiner—Kathryn Ford
Attorney, Agent, or Firm—Ostrolenk, Faber, Gerb & Soffen

[57] ABSTRACT

The disclosure concerns a sectional molding of an elastic material, used for spanning the gap between a pane of glass and the adjacent panel in a window opening of a motor vehicle, or the like. The sectional molding has a generally "I" shaped cross-section, including an ascending web in the gap, a transverse web spanning the space between the pane and the panel and mounting flanges away from the transverse web and extending out from the sides of the ascending web. The mounting flanges are more pliable than the webs and are folded back toward the transverse web upon installation of the sectional molding in the gap. Stiffeners are provided in the ascending and transverse web. Projections on the leading surfaces of the mounting flanges help to secure the same in the gap. A bead at the inserted end of the ascending web anchors the same in sealant in the gap.

13 Claims, 2 Drawing Figures

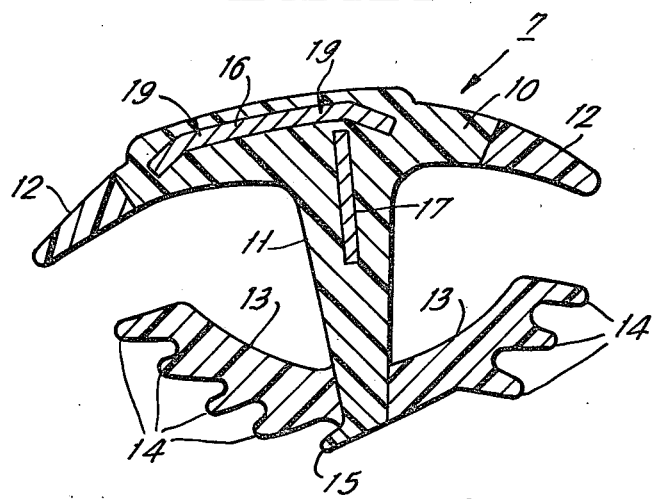
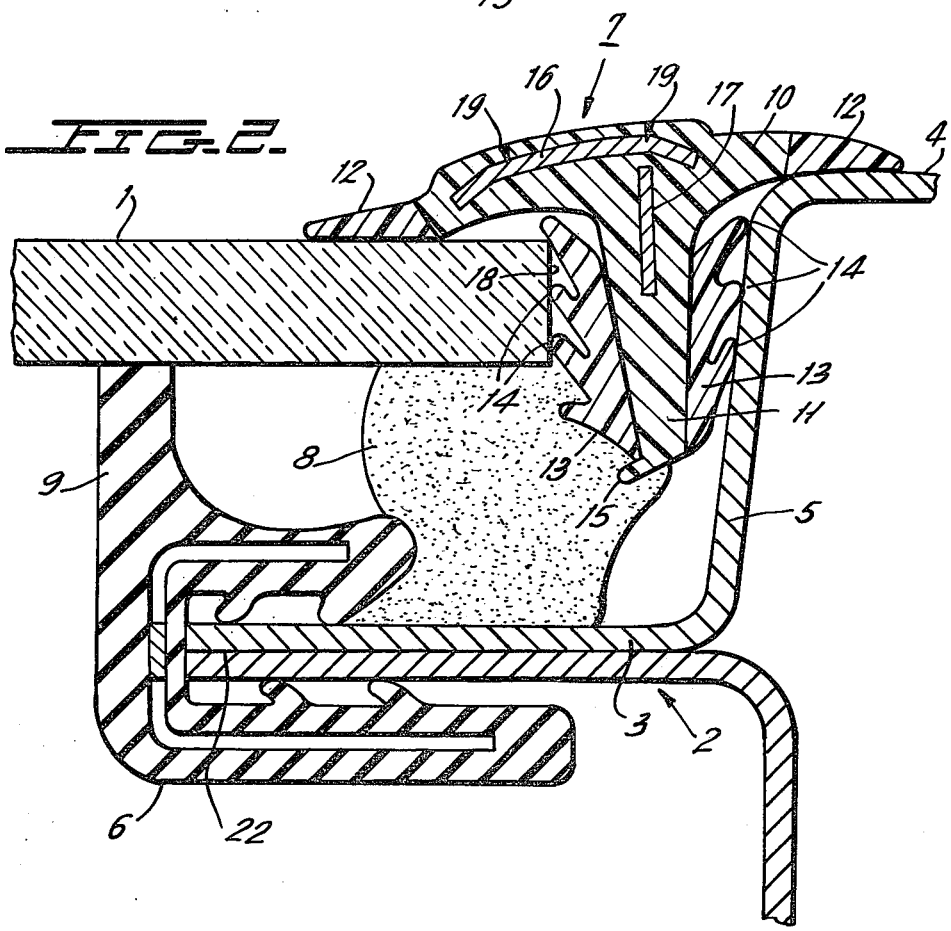

SECTIONAL MOLDING FOR SURROUNDING A PANE OF GLASS SEALED IN THE WINDOW OPENING OF A VEHICLE, OR THE LIKE

BACKGROUND OF THE INVENTION

This invention concerns an elongate sectional molding of plastic or rubber, which surrounds a pane of glass of a window of a vehicle.

Such a molding is known from German Offenlegungsschrift No. 1 801 175, for example. This known molding typically has a T-shaped cross-section, including a vertical leg or ascending web for extending through the gap between the edge of the window pane and the cooperating recess wall or surface that is defined in the vehicle panel which surrounds the window opening. The molding also includes a transverse web attached to the outward edge of the ascending web. The transverse web rests against the exterior of and around the peripheral margin of the pane and against the adjacent area of the vehicle panel.

The above sectional molding may have serrated projections along one side of its ascending web that engages either the edge of the pane and the edge of the window panel next to which the pane fits. Since these projections work in conjunction with resilient tabs of clips located on the edge of the pane, this type of assembly involves the costs of manufacturing, supplying and mounting the relatively expensive clips.

German Auslegeschrift No. 26 34 717 describes a sealing strip that is not capable of holding itself in place, but is instead held in place by a rib on a metal rail. The strip is not useful for surrounding a pane of glass to be sealed in a window opening.

German Auslegeschrift No. 19 14 351 shows weather-stripping. It is not used, nor is it capable of being used, to surround and hold a pane of glass. It is not internally reinforced, nor does it have other features of the invention, which are discussed in detail below.

A number of other publications show T-shaped cross-sections for strips or moldings, but they lack essential features of the invention. These include the strips shown in German Offenlegungsschriften Nos. 28 20 620; 27 16 071; and 269 262; British Pat. No. 556,249 and U.S. Pat. No. 4,165,119.

SUMMARY OF THE INVENTION

The invention concerns a sectional molding of the above-noted type that requires no separately manufactured and mounted holders and that will reliably maintain the pane of glass that is being sealed to the window opening in the desired position while the sealant for the glass pane hardens.

Mounting flanges are molded to and project laterally from the ascending web at the opposite end of the ascending web from the transverse flange. The molding therefore has an I-shaped cross-section, or a cross-section shaped like a double T. The mounting flanges are made of a soft, highly elastic material and are more flexible than the ascending and transverse webs. Stiffening reinforcements or inserts may extend through either or both of the ascending and the transverse webs.

One advantage of the sectional molding of the invention is that it automatically remains in place after it is mounted, because its soft mounting flanges have a coefficient of friction that is high enough to impede removal of the molding from the mounting gap between the pane and the vehicle panel. When the ascending web of the molding is first inserted into the gap between the edge of the pane and the recess wall around the window opening, the mounting flanges of the molding are deformed to a position that more or less parallels the ascending web. As insertion continues, the flanges are forced tightly against both the edge of the pane and the recess wall. This not only fixes the molding firmly in place, but also centers the pane of glass surrounded by the molding. Since the sealed area of the pane essentially rests on a support separate from the molding, since the pane as a whole is centered by the mounting flanges, and since the edges of the pane are overlapped by the transverse web of the molding, the pane will be held reliably in place. This is particularly important while the sealant is drying since the previously required and expensive clamps can be eliminated.

Upon insertion of the ascending web into the gap between the pane and the vehicle panel, the deflected mounting flanges develop respective exterior surfaces away from the ascending web. This surface of each flange is serrated, giving each mounting flange an antler-like cross-section. The serrations are shaped and oriented so that when the ascending web is in the gap, the projections are deflected in the following direction with respect to molding insertion and the projections thereby serve like barbs against removal of the molding from the same side into which it was inserted. This optimizes the holding power of the mounting flanges. Strong holding force is applied by any projection that comes to rest against the edge of the pane and additional gripping occurs with any projection that comes into a position where it overlaps a projection contacting the pane. This makes it even more difficult to pull the molding out of the mounting gap.

A bead of relatively rigid, elastic material runs along the bottom edge of the ascending web. This bead can be anchored in the sealant that holds the pane of glass. This provides further security for the molding, especially when deviations between nominal and actual dimensions are excessive.

The mounting flanges projecting from both sides of the ascending web are each as wide as or slightly narrower in width as the ascending web. This causes the mounting flanges to have relatively extensive friction surfaces.

Reinforcing strips of metal, rigid plastic, or the like stiffeners, are embedded in one or both of the ascending and transverse webs. They are separate elements in each web. The major surfaces of the stiffeners generally parallel the direction of extension of their respective webs. The stiffeners provide the molding with advantageous rigidity, not only along its major plane but also perpendicular to it, which considerably facilitates both manufacture and mounting of the molding. The edges of the stiffener in the transverse web are bent slightly down toward the ascending web, which considerably augments the stabilizing action of the stiffener in the transverse web.

The reinforcing strip in the transverse web may be a decorative strip, or at least its exposable outward surface may be a decorative strip, and that surface can be exposed to view by partly or completely removing the web material covering that surface. Such a molding will not only hold the pane of glass securely and cover the gap between the vehicle panel and the pane, but it will also be decorative.

The molding is pliable enough to be deformed into the shape of whatever glass pane it is intended to surround, and the stiffener in the transverse web is pliable enough to permit this. This has the advantage that vehicle manufacturers can be provided with pre-shaped sectional moldings that are already adapted to the outlines of the window panes and that can be mounted without further finishing. The stiffener in the transverse web is pliable enough to retain the molding in that shape, resulting in an extremely smooth curve, which improves the appearance of the molding.

The side edges of the transverse web are sealing edges comprised of highly elastic, unreinforced plastic material which permit the molding to perform a sealing function and position it against both the pane of glass and the adjacent surface of the vehicle panel in such a way that the molding will readily yield.

The invention will now be further described with reference to the embodiment illustrated in the accompanying drawings.

BRIEF DESCRIPTION OF THE DRAWINGS

FIG. 1 is a cross-sectional view across a molding according to the invention; and FIG. 2 is a cross-sectional view across a mounting for a window, showing the molding installed.

DESCRIPTION OF THE PREFERRED EMBODIMENT

The window in which the molding of the invention is used comprises an opening in the inside and outside panels of the coachwork of a vehicle (not shown). The window is closed off by a pane 1 of glass. The adjacent area 2 of the inside panel surrounds the window. A contact surface 3 of the outside panel rests against the adjacent area of the inside panel. The outside panel 4 is normally spaced away from the inside panel. But, at the window, the outside panel has a recess wall 5 which extends toward the inside panel and joins to the contact surface 3. The recess wall 5 is opposite the edge 18 of the installed glass pane 1. There is a cushion molding 6 which extends around the edge portion of the pane. It is mounted over the spot-weld flange 22 between the inside 2 and outside panels 3, 4 and holds pane 1 away from contact surface 3.

Pane 1 is held against contact surface 3 with a thick layer of an adhesive sealant 8, which may be polyurethane sealant, like those sold under the trademarks Betaseal or Solbit. A shoulder 9 on the cushion molding 6 extends up toward the pane from the spot-weld flange 22. It prevents the sealant 8 from spreading over the pane 1 and helps to hold the pane 1 away from the contact surface 3 of the outside panel.

A sectional molding 7 according to the invention is eventually installed between the edge 18 of the pane 1 and the recess wall 5. The molding has a transverse web 10, which will be on the outwardly facing side of the molding, and has an ascending web 11, which extends between the pane and the recess wall 5 of the outside panel and meets the transverse web to define a T-shape. The web 10 extends out from both sides of the web 11. The webs 10 and 11 of the molding 7 are comprised of a relatively hard, elastic material, like PVC. Sealing edge portions or lips 12 of a soft or high-elasticity material are molded onto the edges of the transverse web 10.

A bead 15 along the leading edge of the ascending web 11 and beyond the below-described mounting flanges 13 anchor molding 7 in sealant 8 when the window pane and molding 7 are assembled.

Mounting flanges 13, which are also made of a soft and high-elasticity material, are molded to each side of ascending web 11, in the vicinity of its edge which leads at insertion, remote from the transverse web 10, in such a way that the cross-section of the unstressed sectional molding 7 will be generally shaped like an "I". The leading surface (bottom in FIG. 1, away from transverse web 10) of the end portions of mounting flanges 13 have several projections 14 that give those flanges an antler-like cross-section. The projections help to hold sectional molding 7 in place, like barbs.

There is a stiffener 16 in the form of a strip of metal in the transverse web 10 of sectional molding 7. Its edges are slightly bent down toward mounting flange 13 to increase its rigidity. There is another separate stiffener 17 in the ascending web 11 and it extends to be adjacent to stiffener 16. Incisions 19 along the outside of transverse web 10 extend down to stiffener 16 permitting it to be uncovered for decorative purposes. The stiffener 16, or at least its top surface, may be anodized, for example, for decoration.

One practical method of mounting the window involves attaching cushion molding 6 at the spot-weld flange 22, applying a strip of sealant 8 to the contact surface 3 and pressing pane 1 against sealant 8. Then the ascending web 11 and mounting flanges 13 of sectional molding 17 are inserted into the gap between the edge 18 of the pane and recess wall 5. This bends flanges 13 back toward the transverse web 10 and the projections 14 press against pane edge 18 on one side and against recess wall 5 on the other. The transverse web 10 of sectional molding 7 now rests against the margins of both pane 1 and the adjacent area 4 of the outside panel. This permanently centers pane 1 and holds it firmly in place so that no clamps will be required while the sealant 8 is drying. Since mounting flanges 13 are made of a relatively soft material, it will be very difficult to extract the sectional molding 7 from the mounting gap in which it is installed.

Although the present invention has been described in connection with a preferred embodiment thereof, many variations and modifications will now become apparent to those skilled in the art. It is preferred, therefore, that the invention be limited not by the specific disclosure herein, but only by the appended claims.

What is claimed is:

1. An elongate sectional molding for surrounding a pane of glass to be held in a window opening, the molding including:

an ascending web, for emplacement in the gap between, and the ascending web having opposite sides respectively facing, the edge of the pane of glass and the panel which is opposite to and surrounds the pane;

a transverse web across the ascending web and extending away from both opposite sides of the ascending web for resting upon the exterior side of the pane and of the panel surrounding the pane; the ascending and transverse webs being comprised of an elastic material;

respective mounting flanges extending away from both opposite sides of the ascending web and being spaced along the ascending web from the transverse web; the mounting flanges being comprised of a more highly elastic material than the ascending and transverse webs; the mounting flanges being adapted for deflecting toward the transverse web as the ascending web and the mounting flanges are installed between the edge of the pane of glass and the panel; the mounting flanges and the ascending and transverse webs being together placed and shaped to give the sectional molding a generally "I" shape;

each mounting flange having a surface facing away from the transverse web, and that surface having projections defined on it for providing engagement with cooperating surfaces defining the gap between the pane and the surrounding panel; the projections being inclined outwardly from the ascending web and toward the transverse web as the mounting flanges are deflected toward the transverse web for the projections to act as barbs to prevent withdrawal of the mounting flanges from between the pane and the surrounding panel.

2. The sectional molding of claim 1, further comprising a bead of elastic material, which is more rigid than the mounting flanges, running along the ascending web beyond the mounting flanges away from the transverse web, and the bead being anchorable in sealant for holding the sectional molding in position in the gap between the pane and the surrounding panel.

3. The sectional molding of claim 1, wherein each mounting flange is at most as wide, in its length away from the ascending web, as the length of the ascending web between the mounting flanges and the transverse web.

4. The sectional molding of claim 1, further comprising stiffeners in the ascending and transverse webs for stiffening them.

5. The sectional molding of claim 4, wherein the stiffeners are generally flat and each has major surfaces which parallel the respective surfaces of the respective webs including the stiffeners.

6. The sectional molding of either of claims 4 or 5, wherein the stiffeners are comprised of metal.

7. The sectional molding of claim 5, wherein the stiffener in the transverse web has edges which are bent down toward the ascending web.

8. The sectional molding of either of claims 4 or 5, wherein the transverse web is pliable enough to be bent over a pane and the stiffener in the transverse web is pliable enough for such bending and is rigid enough to retain the bent shape of the transverse web.

9. The sectional molding of claim 8, wherein the transverse web includes edges comprised of a highly elastic material for sealing purposes.

10. The sectional molding of either of claims 1 or 5, wherein the transverse web includes edges comprised of a highly elastic material for sealing purposes.

11. The sectional molding of claim 2, further comprising stiffeners in the ascending and transverse webs for stiffening them; the stiffeners are generally flat and each has major surfaces which parallel the respective surfaces of the respective webs including the stiffeners.

12. In combination, a window opening, a window in the opening and a sectional molding, comprising:

the window opening comprising a panel with an opening therein shaped for defining a window opening, the window comprising a pane of window glass for being supported at the window opening and for closing the opening, an edge around the pane, a layer of sealant around the edge of the pane and around the panel at the opening therein for securing the pane to the panel, the panel being shaped at the opening and the pane being sized that a gap is defined between the peripheral edge of the pane and a surface of the panel opposite the pane;

the sectional molding bridging the gap between the pane and the panel and for aiding in securment of the pane to the panel; the sectional molding being elongate for surrounding the pane of glass; the molding including:

an ascending web, for emplacement in the gap between, and the ascending web having opposite sides respectively facing, the edge of the pane of glass and the panel which is opposite to and surrounds the pane;

a transverse web across the ascending web and extending away from both opposite sides of the ascending web for resting upon the exterior side of the pane and of the panel surrounding the pane; the ascending and transverse webs being comprised of an elastic material;

respective mounting flanges extending away from both opposite sides of the ascending web and being spaced along the ascending web from the transverse web; the mounting flanges being comprised of a more highly elastic material than the ascending and transverse webs; the mounting flanges being adapted for deflecting toward the transverse web as the ascending web and the mounting flanges are installed between the edge of the pane of glass and the panel; the mounting flanges and the ascending and transverse webs being together placed and shaped to give the sectional molding a generally "I" shape;

each mounting flange having a surface facing away from the transverse web, and that surface having projections defined on it for providing engagement with cooperating surfaces defining the gap between the pane and the surrounding panel; the projections being inclined outwardly from the ascending web and toward the transverse web as the mounting flanges are deflected toward the transverse web for the projections to act as barbs to prevent withdrawal of the mounting flanges from between the pane and the surrounding panel.

13. The combination of claim 12, further comprising a bead of elastic material, which is more rigid than the mounting flanges, running along the ascending web beyond the mounting flanges away from the transverse web; and the bead of elastic material being so shaped and placed and the layer of sealant being so placed and shaped that the bead extends into the sealant.

* * * * *